(12) United States Patent
Currie

(10) Patent No.: US 7,075,423 B2
(45) Date of Patent: Jul. 11, 2006

(54) COMBINATION ILLUMINATING INVERSE FUNCTION POWER INDICATOR AND A BRAKE LIGHT

(76) Inventor: Joseph Edward Currie, 506 White Plains Rd., Webster, NH (US) 03303-7112

( * ) Notice: Subject to any disclaimer, the term of this patent is extended or adjusted under 35 U.S.C. 154(b) by 366 days.

(21) Appl. No.: 10/678,616

(22) Filed: Oct. 6, 2003

(65) Prior Publication Data

US 2005/0073401 A1    Apr. 7, 2005

(51) Int. Cl.
*B60Q 1/50* (2006.01)
(52) U.S. Cl. ............... 340/467; 340/475; 340/479; 340/815.45
(58) Field of Classification Search ......... 340/479, 340/475, 468, 464, 463, 332, 815.4, 815.45, 340/691.3, 691.4, 467
See application file for complete search history.

(56) References Cited

U.S. PATENT DOCUMENTS

| | | | | |
|---|---|---|---|---|
| 2,734,105 A | * | 2/1956 | Perry ................. | 340/467 |
| 3,638,181 A | * | 1/1972 | Bryant ................ | 340/467 |
| 3,748,643 A | * | 7/1973 | Jacobs ................ | 340/467 |
| 4,924,207 A | * | 5/1990 | Lariscy ............... | 340/464 |
| 5,089,805 A | * | 2/1992 | Salsman .............. | 340/464 |
| 5,463,370 A | * | 10/1995 | Ishikawa et al. ...... | 340/439 |
| 5,629,669 A | * | 5/1997 | Asano et al. ......... | 340/436 |
| 5,856,793 A | * | 1/1999 | Tonkin et al. ........ | 340/479 |
| 6,150,933 A | * | 11/2000 | Matsumoto ........... | 340/479 |
| 6,356,833 B1 | * | 3/2002 | Jeon .................. | 340/439 |
| 6,675,650 B1 | * | 1/2004 | Paulo ................. | 340/815.45 |
| 6,753,769 B1 | * | 6/2004 | Elliott ............... | 340/479 |

FOREIGN PATENT DOCUMENTS

| | | | |
|---|---|---|---|
| DE | 4035185 A1 | * | 5/1992 |
| GB | 2258531 A | * | 2/1993 |
| GB | 2382404 A | * | 5/2003 |

* cited by examiner

*Primary Examiner*—Thomas Mullen

(57) ABSTRACT

Disclosed is a multi-function illuminating display for a motor vehicle combining an inverse function illuminating engine power indicator, a brake light, directional lights, and park lights. The segmented engine power display is fully illuminated at engine idle. Power display illumination decreases incrementally from each end as engine power increases, with minimum illumination at display center at maximum selected and adjusted power, and no illumination when power is above that point. Decreasing engine power to the maximum power point illuminates the center segments, followed by incrementally illuminating segments adjacent the center, until all segments are illuminated. Center segment illumination is of minimum intensity with increasing intensity of left and right side LEDs. The brake light inhibits power indication and illuminates the display as a brake light. Chasing directional lights have priority over the power indication and park lights, and are brighter than the park lights.

1 Claim, 5 Drawing Sheets

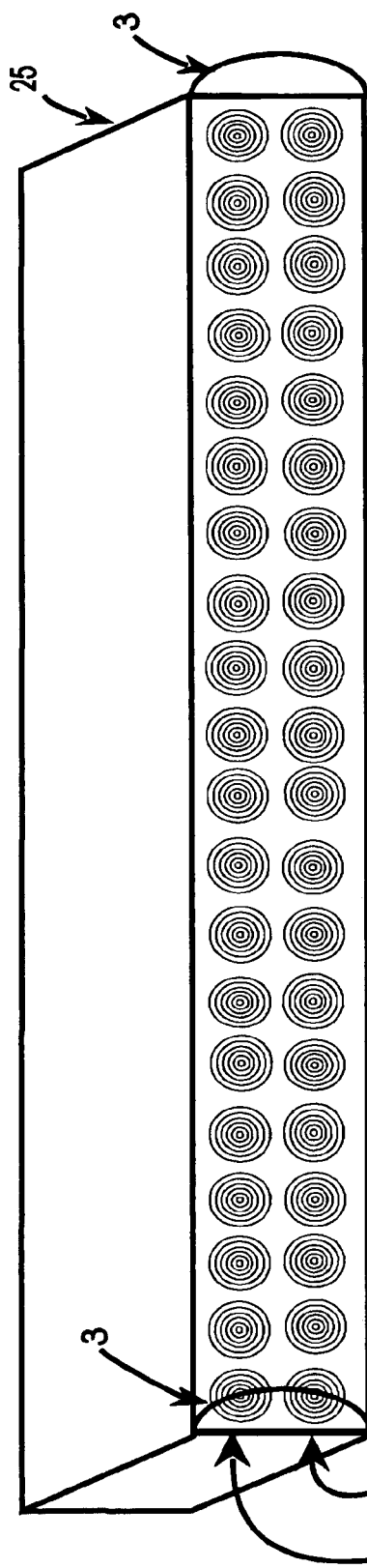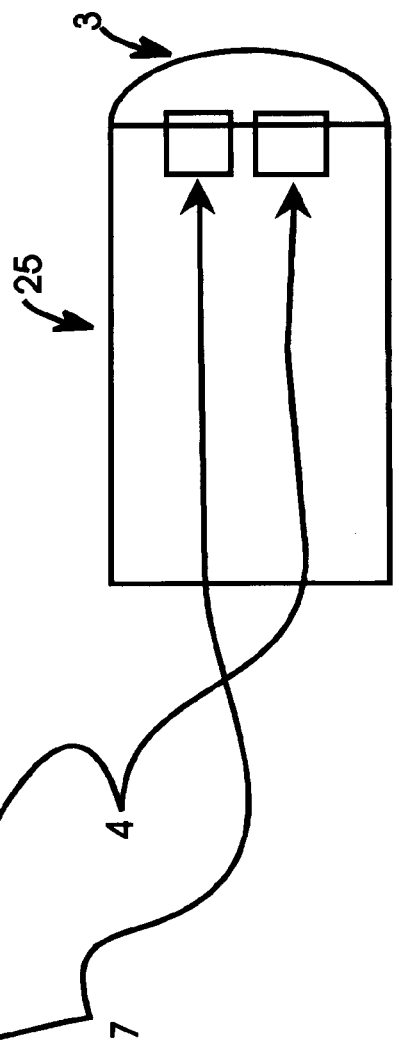

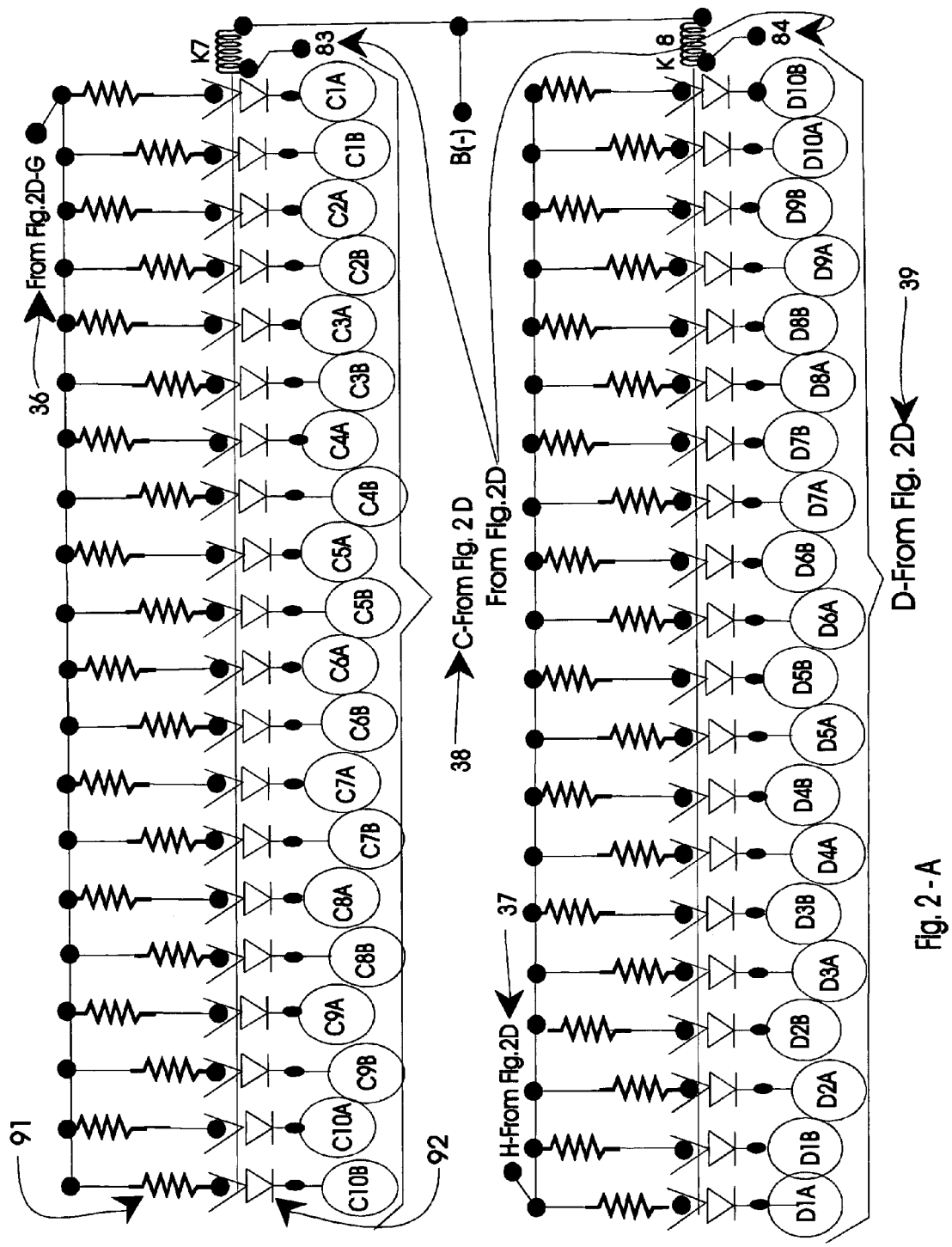
Fig. 2 - A

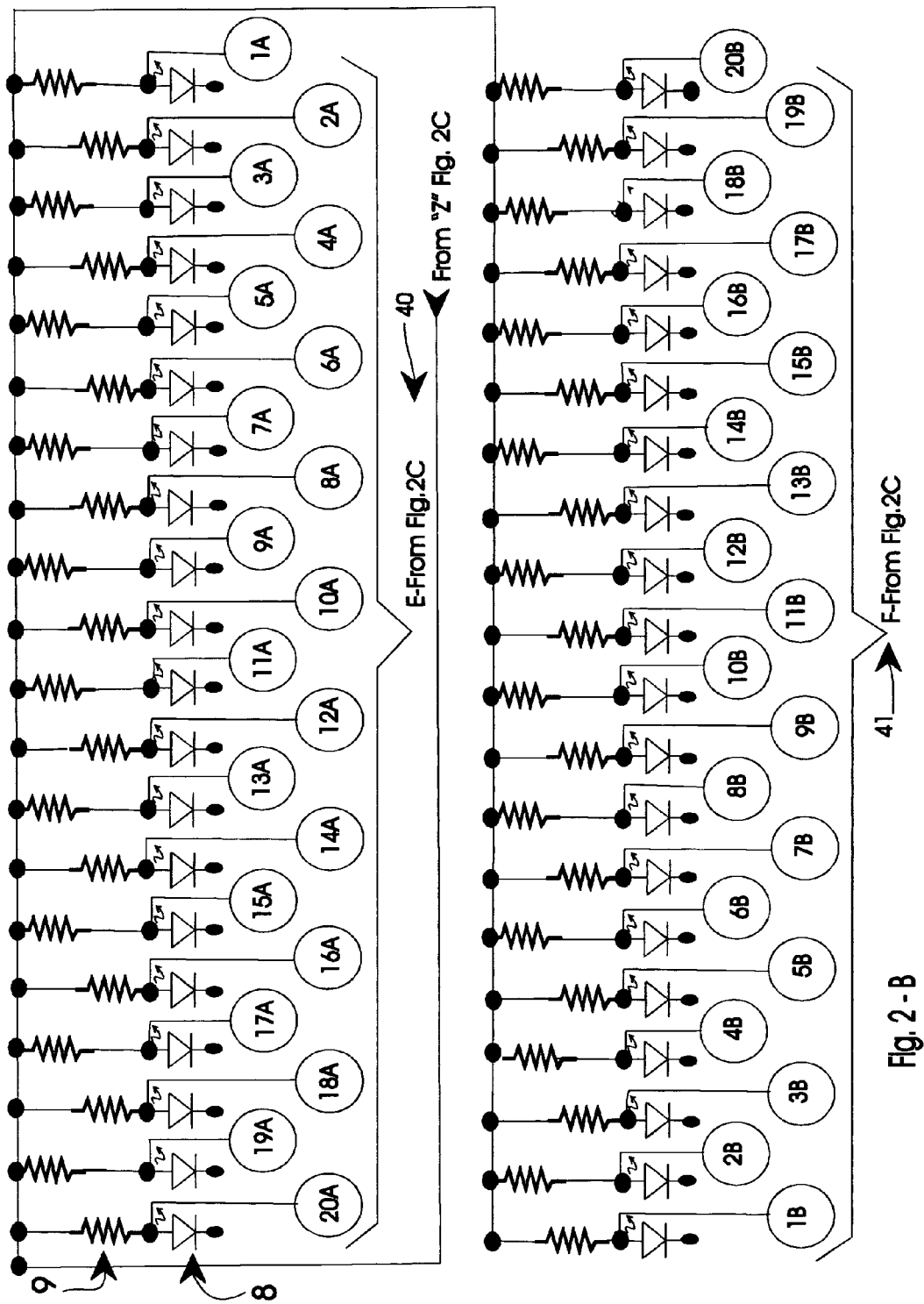
Fig. 2 - B

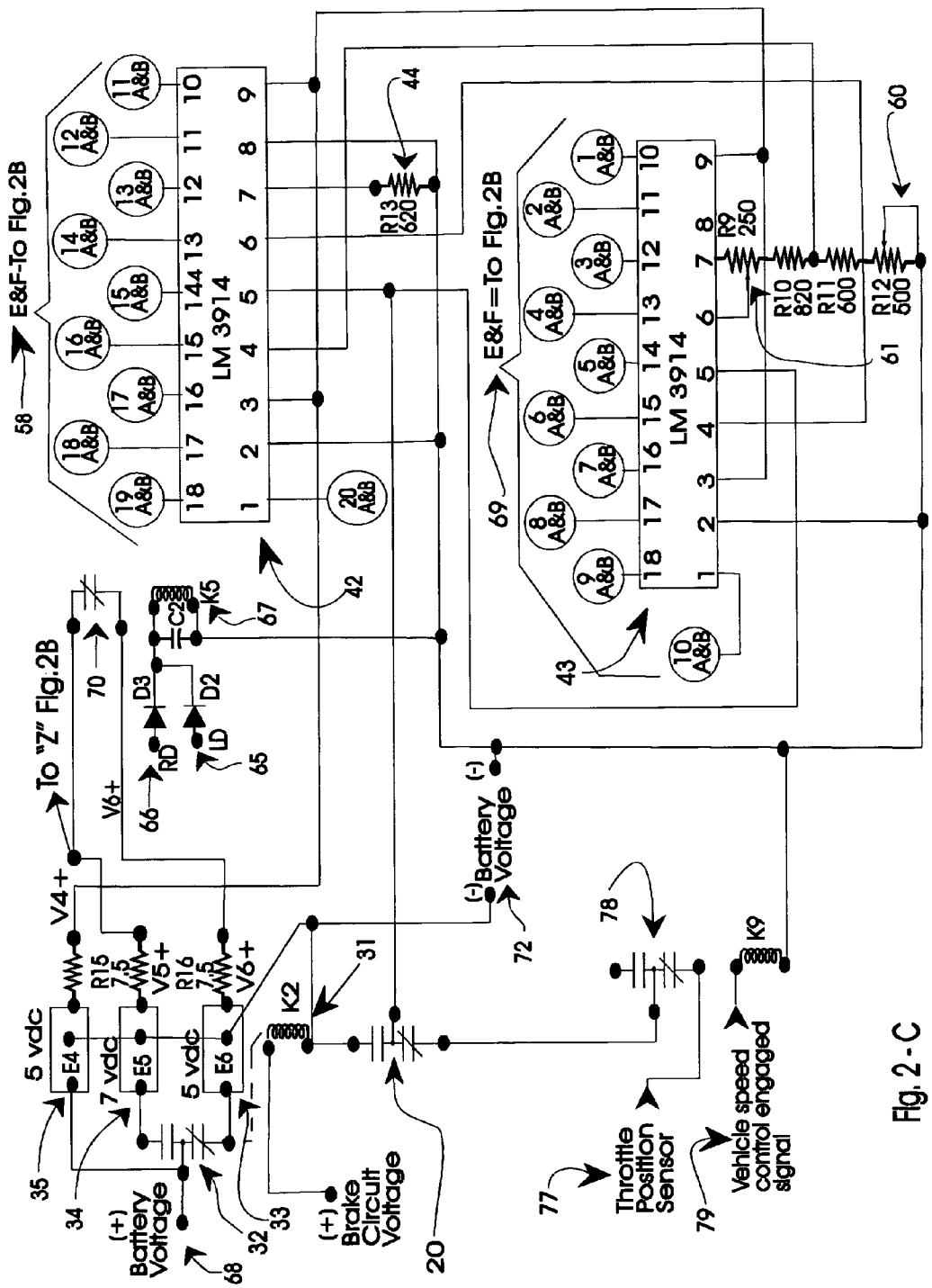
Fig. 2-C

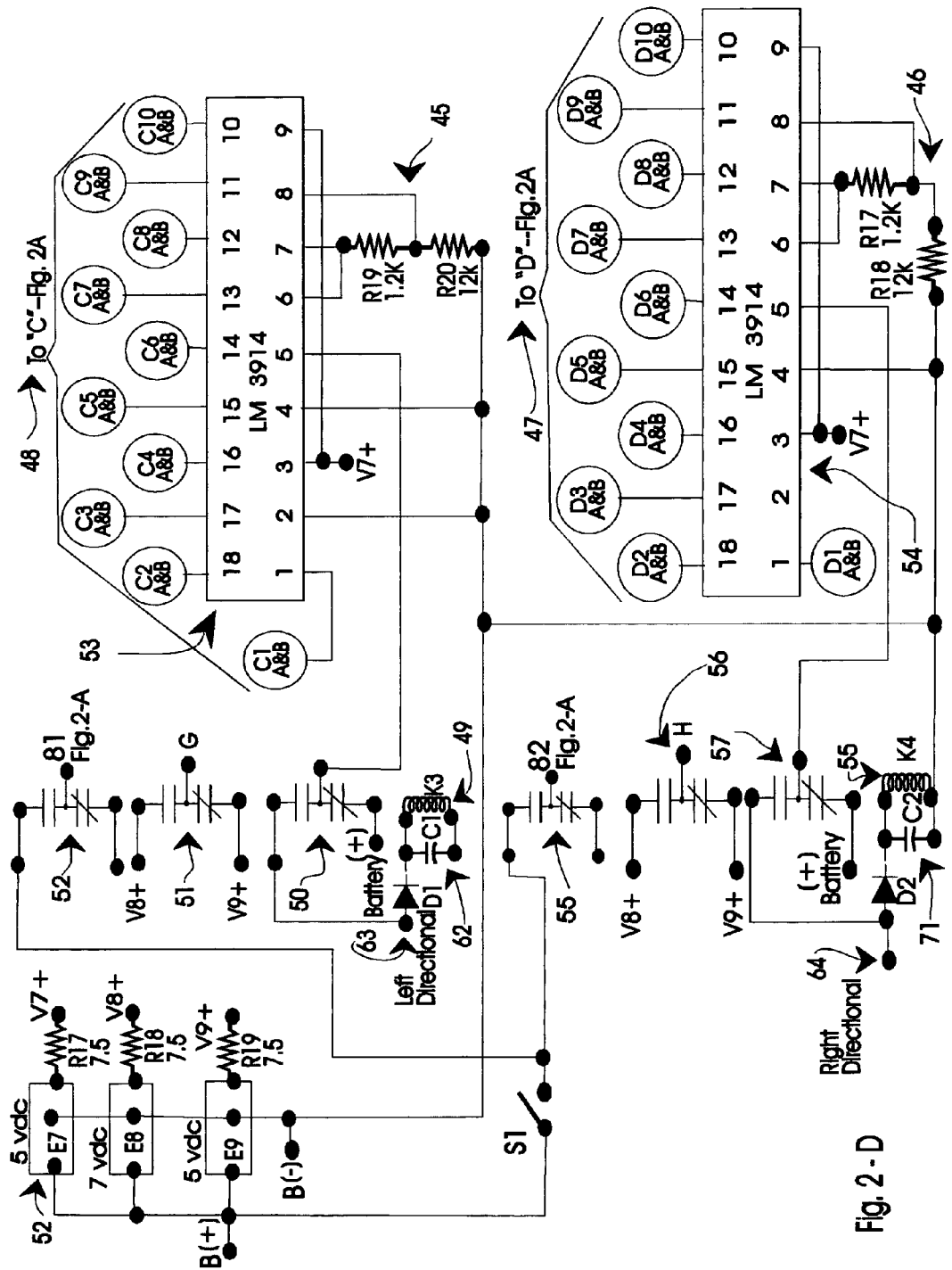
Fig. 2 - D

COMBINATION ILLUMINATING INVERSE FUNCTION POWER INDICATOR AND A BRAKE LIGHT

CROSS REFERENCE TO RELATED APPLICATIONS (Not applicable)

1. Background of the Invention

This invention relates to automotive lighting systems and signals, and more particularly to automotive lights and illuminating signals visible to a driver of a following vehicle.

2. Description of the Prior Art

The use of a myriad of motor vehicle safety lighting signals and systems is known in the prior art. However rear end collisions have always been and continue to be a major driving hazard regardless of all prior art and the efforts of all automotive regulatory agencies. Automotive manufacturers have improved the visibility and placement of present day illuminated automotive signal lights, however as most motor vehicle drivers have experienced, the brake lights of a lead vehicle, regardless of how visible they are, can illuminate with no advance warning or reason visible to a following vehicle driver. Even if a driver of a following vehicle is maintaining a reasonable following distance between his vehicle and a lead vehicle, many factors influence the reaction time of the following vehicle driver to the red brake light indication of the lead vehicle. There are many examples of inventive means disclosed in the crowded prior art intended to mitigate the danger of motor vehicle rear end collisions.

A first example is U.S. Pat. No. 3,676,844 issued to Hendrickson on Jul. 11, 1972 discloses an automotive vehicle signal light warning method that signals two conditions to a following vehicle driver to wit: the under power and not under power condition of the vehicle.

a. Bartilucci, in U.S. Pat. No. 5,663,707, issued Sep. 2, 1997, discloses signal lights of green, red, and yellow light emitting diodes, visible through a rearview window of a vehicle, and operated by electrical signals from a vehicle accelerator pedal, brake pedal, transmission, and turn signals.

b. U.S. Pat. No. 3,846,748, issued to Hopwood on Nov. 5, 1974, discloses a signaling system and sensor comprised of a mercury switch sensitive to acceleration, deceleration, and constant motion with associated signaling lights to indicate acceleration or deceleration of a vehicle.

c. Arnold, in U.S. Pat. No. 6,486,774 issued Nov. 26, 2002, discloses a vehicular deceleration warning system that includes an accelerator pedal pressure sensor and a visual signal means.

d. U.S. Pat. No. 4,970,493, issued to Yim on Nov. 13, 1990, discloses a lighting system for a motor vehicle with electrical switches that can be removably attached to the accelerator and brake pedal; pressure on said accelerator pedal illuminates a green light and removal of said pressure lights an amber light.

e. Francis, in U.S. Pat. No. 5,663,706, issued on Sep. 2, 1997, discloses an automotive alert system with a rearward facing light that illuminates when both the brake pedal and accelerator pedal are released However, none of the above-cited references, taken in whole or in part, anticipate, render obvious, suggest or imply the concept of this new, novel, and unique combination illumination device comprised of an inverse function illuminating engine power indicator, a brake light, unique directional lights, and parking lights that cooperate with one another.

SUMMARY OF THE INVENTION

The embodiment of this invention is an illuminating device comprised of two rows of illuminating segments, one above the other, with the top row of segments dedicated to operate as a combined engine power and brake light, and the lower row of segments dedicated to function as a combination park light and left and right turn directional lights. A brake light function, with primary priority over the engine power level function, will illuminate the top row of segments used for engine power indication as a brake light when the vehicle brakes are applied. A directional light function, with secondary priority over the power level function, will cause the power level function to cease operation so long as a turn is signaling, and the brake is not applied. If the brake is applied at the same time a turn is signaling, the top row of segments that display engine power will illuminate as a brake light, and the lower row of segments dedicated as combination park and directional lights will operate as a directional light on the signaled side, and as a park light on the non signaled side. A manually operated electrical switch is provided that will change the color of the dual-color LEDs used in the directional light display from red to amber when amber colored directional lights are required.

The illuminating display of choice for this combination illuminating device is a segmented horizontal display in a rectangular shape with a translucent combination lens and cover. An electronic circuit with an analog dc voltage input from a throttle position sensor controls the power display function of this combination illuminating device. The input voltage from a throttle position sensor conducts through a normally closed relay contact that will open when a vehicle speed control is switched to an on or energized condition preventing operation of the engine power function of the display when the vehicle speed is automatically controlled. The circuit allows for adjusting and setting a top of range power point and a bottom of range power point. The top power point is that selected engine power level above which there is no illumination of the display segments, and below which the display starts illuminating. As engine power decreases below the top selected point the center segment of the display illuminates. A first incremental decrease in engine power below that point causes the second segments, segments on both sides and adjacent the center segment, to illuminate. A second incremental decrease in engine power causes the third segments, segments on both sides and adjacent the second segments to illuminate. This process repeats until the power level decreases to or below the bottom of range selected and adjusted power point. At or below the bottom selected power point all segments of the segmented power function display are illuminated.

The electronic circuit provides for different values of resistance in series with the display segments. The different values of resistance cause the center display segments of the engine power indication to illuminate at a relatively dim or decreased value of illumination. The second segments on both sides of the center segment illuminate at a noticeable increase in illumination relative to the center segment, and the third segments on both sides of the second segments illuminate at a higher value of lumens relative to the second segments, and so on, until the final left and right end segments of the display illuminate at a level just noticeably below that of illuminated brake lights.

The electronic circuit also provides time delays between the illumination of the center segment and the transcending pairs of segments of the upper horizontal row of red LEDs that function as an engine power indication, and time delays between the ascending illuminations of the dual-color red/amber LEDs of the lower row directional signal indication. These time delays are provided so that a human eye can see the increasing or decreasing number of illuminating segments of the engine power display in defined steps at a time when engine power is abruptly changed from high to low, or low to high, and see a step by step increase in the length of the red/amber directional signal indication when a turn is signaled.

BRIEF DESCRIPTION OF THE DRAWINGS

FIG. 1A is a front view of the housing and display of this invention and FIG. 1B is a side view of the housing and display.

FIGS. 2A, 2B, 2C, and 2D comprise a view of a typical electronic control circuit for the embodiment of this invention.

DETAILED DESCRIPTION OF THE PREFERRED EMBODIMENTS

The embodiment of the invention is a multi-function display for a motor vehicle disclosed in FIGS. 1A and B and in FIGS. 2-A, 2-B, 2-C, & 2-D. Two horizontal rows of light emitting diodes, herein after LEDs, with series current limiting resistors are depicted in FIGS. 2A & 2B and are mounted in housing 25 at 7 and 4 of FIGS. 1A & 1B and covered by combination lens/cover 3 shown in FIGS. 1A and 1B. The LEDs of FIG. 2B are operated as a combination inverse function engine power indicator and brake light and the LEDs of FIG. 2A are operated as combination park and directional lights.

During non-braking conditions vehicle battery power 68, FIG. 2-C, conducts through the normally closed side of form C contact 32 to voltage regulator E6 at location 33. The 5-vdc output from E6 conducts through the normally closed contact of relay K5 at location 67 to the positive side of the LEDs depicted in FIG. 2B at "Z". Throttle position sensor voltage is conducted through the normally closed side of form C contacts 78 and 20, FIG. 2C, to input pins 5 of bar/dot drivers 42 and 43. A vehicle speed control system engaged signal voltage at 79, FIG. 2C, will operate relay K9 opening the normally closed side of contact 78 preventing operation of the engine power function of the multi-function display depicted as the upper row of LEDs 7 of FIG. 1A. The internal voltage dividers of bar/dot drivers 42 and 43 are connected in series by connecting pin 6 of 42 to pin 4 of 43. The low end of the voltage operating range of the series bar/dot drivers is set by manual adjustment of variable resistor R12 at location 60 and connected to pin 4 of bar/dot driver 42. The high end of the voltage operating range is set by manual adjustment of potentiometer R9 at location 61 and connected to bar/dot driver 43 at pin 6. The outputs of bar/dot drivers 42 and 43 are connected to the anodes of LEDs 8 between the current limiting resistors 9 and LEDs 8 of FIG. 2B. This connection enables the outputs of bar/dot drivers 42 and 43 to switch the LEDs to on with no input, or a low input on pins 5 of bar/dot drivers 42 and 43. As the input voltage 77 from the throttle position sensor (TPS) to pins 5 of bar/dot drivers 42 and 43 increases above the adjusted low end of range voltage of bar/dot driver 42, the first output of driver 42 at pin 1 is switched on and LEDs 20 A&B on the left and right end of LEDS 8 on FIG. 2B are switched off. Further increasing TPS voltage at 77, FIG. 2C, will turn off LEDs 8, FIG. 2B in sequence from LEDs 20A & 20B toward LEDs 1A & 1B. TPS voltage at 77, FIG. 2C, above the high-end of range set point will turn on all outputs of drivers 42 and 43 and turn off all LEDs 8 on FIG. 2B. Decreasing TPS voltage at 77, FIG. 2C, down to the set point defining the top of display range will turn off top of display driver output pin 10 of bar/dot driver 43 illuminating the two center segment LEDs 8 at 1A and 1B of FIG. 2B. Further decreases in TPS voltage at 77, FIG. 2C, will turn off more bar/dot driver 42 and 43 outputs and illuminate more display segments adjacent both sides of the center segment LEDs at 1A and 1B on FIG. 2B.

Input voltage from the TPS to pins 5, FIG. 2C, of bar/dot drivers 42 and 43 that is within the set operating range will operate the bar/dot driver outputs and illuminate the LEDs depicted on FIG. 2B. Operation of the vehicle brake circuit will energize relay K2 at location 31, FIG. 2C, and disconnect input pins 5 of bar/dot drivers 42 and 43 from the TPS voltage, 77, and connect said input pins 5 to circuit common 72. Circuit common connected to the inputs of bar/dot drivers 42 and 43 will switch off all bar/dot driver outputs and illuminate all LEDs depicted on FIG. 2B as brake lights. Also contact 32 of relay K2, shown at 31 on FIG. 2C, operates disconnecting vehicle power from regulator E6 at location 33, and connecting said power to regulator E5 at location 34. The 5-vdc output of E6 is replaced by the 7-vdc output of E5 and is connected to the positive side of the LEDs 8 on FIG. 2B to increase their illumination to that of brake lights. Operation of either the left turn signal at 65 on FIG. 2C, or right turn signal at 66, will energize relay K5 at location 67 and open normally closed contact 70. Opening contact 70 will inhibit illumination of LEDs 8 of FIG. 2B operating in the power indication mode. Opening contact 70 on FIG. 2C during brake light function mode will not inhibit said brake light function.

The LEDs of FIG. 2A function as combination park lights and as directional turn signal lights. During non-directional turn signal conditions 5 vdc is supplied to the anodes of the LEDs depicted in FIG. 2A. If a left or right turn is signaled the 5 vdc on the signaled side of the display is replaced by 7 vdc, and the signaled side operates in a stepped sequence illuminating from the center to the outer illuminating segment during each signal pulse of voltage on the signaled side. When electrical switch S1 of FIG. 2D is manually closed and a left turn signal voltage operates relay K3, B+voltage conducts through the normally open side of contact 81 and is output to 83 of FIG. 2A operating relay K7 causing the dual-colored LEDs of the combination park and directional light display on FIG. 2A to illuminate amber colored. Right turn directional voltage connected at 64 of FIG. 2D operates relay K4 closing the normally open side of contact 82, location 55, operating relay K8 at location 84 of FIG. 2A, causing the dual-colored LEDs of the right turn signal display to illuminate amber colored. The side opposite the signaled side continues to illuminate in a red color park light mode. Also, if the LEDs depicted in FIG. 2B are operating in the power display mode, they will be inhibited during turn signal operation of the LEDs depicted in FIG. 2A by operation of relay K5 on FIG. 2C.

Park light function of the dual-colored LEDs depicted in FIG. 2A is accomplished by conducting positive vehicle battery voltage through the normally closed side of form C contact 50, detailed on FIG. 2D, as input to display left side bar/dot driver 53, and through the normally closed side of form C contact 57 to the input of right side bar/dot driver 54. Plus 5 vdc is conducted through the normally closed side of form C contact 51 of relay K3, location 49, to the common of the LED current limiting resistors, FIG. 2A at G, location 36, and through the normally closed side of form C contact 56, FIG. 2D, to the common of the LED current limiting resistors, FIG. 2A at H, location 37. With positive battery as input to pins 5 of bar/dot drivers 53 and 54, FIG. 2D, all bar/dot driver outputs are switched on and all LEDs detailed in FIG. 2A illuminate at park light intensity.

When the first left turn signal positive voltage pulse is applied at 63, FIG. 2D, it conducts through diode D1 charging capacitor C1 at location 62, and energizes relay K3 at location 49. The discharge of C1 through the coil of K3 maintains K3 in an energized state between turn signal voltage pulses. Form C contact 50 operates removing positive battery from input pin 5 of bar/dot driver 53, and replaces it with a positive left turn directional signal voltage pulse. The positive left turn signal voltage pulse on input pin 5 of bar/dot driver 53 will cause the outputs of bar/dot driver 53 to switch on, beginning with output one which is connected to FIG. 2A left center LEDs 92 at C1 A&B, and ending with output ten which is connected to FIG. 2A left end LEDs C10 A&B. At the end of the left turn signal voltage pulse the left side display illumination will extinguish until the next left turn signal voltage pulse restarts the illuminating sequence. The second form C contact 51 of relay K3, location 49, operates and switches the anode supply voltage G of the LED display left side from positive 5 vdc to positive 7 vdc increasing the illumination intensity of the left side of the display during operation of the turn signal function. Removal of left turn signal positive voltage pulses from 63 de-energizes relay K3 location 49, reconnecting battery positive through the normally closed side of contact 50 to input pin 5 of bar/dot driver 53 causing the LED anode supply voltage to change from plus 7 vdc back to plus 5 vdc thereby returning the left side of the display to the park light function.

When the first right turn signal positive voltage pulse is applied at 64, FIG. 2D, it conducts through diode D2 charging capacitor C2 at location 71, energizing relay K4 at location 55. The discharge of C2 through the coil of K4 maintains K4 in an energized state between turn signal voltage pulses. Form C contact 57 operates removing positive battery from input pin 5 of bar driver 54, and replaces it with a positive right turn directional signal voltage pulse. The positive right turn signal voltage pulse on input pin 5 of bar/dot driver 54 will cause the outputs of bar/dot driver 54 to switch on beginning with output one, which is connected to the right side center LEDs 92 at D1 A&B of FIG. 2A, and ending with output ten which is connected to right end LEDs 92 at D10 A&B. At the end of the right turn signal voltage pulse the right side display illumination will extinguish until the next right turn signal voltage pulse restarts the illumination sequence. The second form C contact 56 of relay K4 location 55, operates and switches the anode supply voltage H to the LED display right side from positive 5 vdc to positive 7 vdc increasing the illumination intensity of the right side of the display during operation of the turn signal function. Removal of right turn signal positive voltage pulses from 64 de-energizes relay K4 location 55, reconnecting battery positive to input pin 5 of bar/dot driver 54 causing the LED anode supply voltage to change from plus 7 vdc back to plus 5 vdc thereby returning the left side of the display to the park light function.

The invention claimed is:

1. A multi-function illuminating display device for a motor vehicle, including a housing, first illuminating means on said housing to display an inverse function engine power indication combined with a brake light signal means, and second illuminating means on said housing to display left and right directional turn signal means combined with left and right park light display means, wherein:
 a. said housing is equipped with a translucent combination lens and cover over an illuminating surface of said housing;
 b. the first illuminating means includes a horizontal row of single-color red light emitting diodes, (LEDs);
 c. the second illuminating means includes a horizontal row of dual-color red/amber LEDs;
 d. the engine power indication has an associated electronic circuit that enables manual adjustment of electrical parameters that define the high and low end limits of an engine power indication operating range within which the red LEDs operate as the engine power indication;
 e. the red LEDs when operating as the engine power indication do not operate above the manually adjusted high end limit, or below the manually adjusted low end limit, of the engine power indication operating range, and are sequentially activated and deactivated in inverse proportion to the engine power within the operating range;
 f. the engine power indication is turned off by the associated electronic circuit during input to the associated electronic circuit of a vehicle brake light signal;
 g. a vehicle brake light signal input to the associated electronic circuit is displayed by illuminating the horizontal row of red LEDs;
 h. the engine power indication is turned off by the associated electronic circuit during input to the associated electronic circuit of an electrical signal designating a left or right side vehicle turn;
 i. the engine power indication is turned off by the associated electronic circuit during the time a vehicle speed control system is turned on and a hold speed is selected in use of the vehicle speed control system;
 j. the horizontal row of red LEDs when operating as the engine power indication display decreasing engine power by illuminating center of row LEDs at minimal illumination intensity followed by illumination of corresponding pairs of successive adjacent LEDs at noticeable increasing levels of illumination intensity until left and right end of horizontal row LEDs are illuminated at nominal brake light intensity;
 k. activating the left and right directional turn signal means comprises illuminating the left half and the right half, respectively, of the horizontal row of dual color red/amber LEDs;
 l. the number of red/amber LEDs that illuminate to indicate a signaled left or right turn progressively increases starting with the center of the horizontal row of red/amber LEDs and progressing toward the end of the horizontal row of red/amber LEDs corresponding to the direction of the signaled turn, all such LEDs then being extinguished before the sequence is repeated;
 m. the horizontal row of red/amber LEDs when operating as the turn signal means are illuminated at a nominal brake light intensity; and
 n. in the absence of a left or right directional turn signal indication, the horizontal row of red/amber LEDs will illuminate in a red color at a nominal park light intensity.

* * * * *